(12) United States Patent
Fux et al.

(10) Patent No.: US 10,464,245 B2
(45) Date of Patent: Nov. 5, 2019

(54) DEVICE FOR DOSING BULK MATERIAL

(71) Applicant: WITTMANN KUNSTSTOFFGERAETE GMBH, Vienna (AT)

(72) Inventors: Erhard Fux, Michelhausen (AT); Nicholas Arthur Paradiso, Naugatuck, CT (US)

(73) Assignee: WITTMANN KUNSTSTOFFGERAETE GMBH, Vienna (AT)

( * ) Notice: Subject to any disclaimer, the term of this patent is extended or adjusted under 35 U.S.C. 154(b) by 39 days.

(21) Appl. No.: 15/537,056

(22) PCT Filed: Dec. 17, 2015

(86) PCT No.: PCT/AT2015/000160
§ 371 (c)(1),
(2) Date: Jun. 16, 2017

(87) PCT Pub. No.: WO2016/094914
PCT Pub. Date: Jun. 23, 2016

(65) Prior Publication Data
US 2017/0348886 A1  Dec. 7, 2017

(30) Foreign Application Priority Data
Dec. 19, 2014 (AT) .................................. A 926/2014

(51) Int. Cl.
G01G 21/28 (2006.01)
G01G 19/24 (2006.01)
(Continued)

(52) U.S. Cl.
CPC .......... B29C 45/1808 (2013.01); B65D 88/32 (2013.01); B65G 65/40 (2013.01);
(Continued)

(58) Field of Classification Search
CPC ...... G01G 13/003; G01G 17/00; G01G 19/24; G01G 21/28; B65G 65/40; B65D 88/32; B29C 45/1808
See application file for complete search history.

(56) References Cited

U.S. PATENT DOCUMENTS 3,822,866 A   7/1974 Daester et al.
8,092,070 B2  1/2012 Maguire
(Continued)

FOREIGN PATENT DOCUMENTS

DE   19528636   2/1997
DE   69627717   1/2004
(Continued)

*Primary Examiner* — Randy W Gibson
(74) *Attorney, Agent, or Firm* — Greenblum & Bernstein, P.L.C.

(57) ABSTRACT

A device for dosing bulk material, in particular plastic granules, for machines that process plastic granules, in particular for injection molding machines. The invention provides a bulk material feed (1), a material hopper (3) formed by multiple, preferably four, individually removable material hopper containers (2) and arranged under the bulk material feed (1) and ending in a dosing base device (4), and, optionally, a weighing container with a scale in the dosing base device (4). The individual material hopper containers (2) are arranged on a support spider (5) and the support spider (5) is formed by support spider plates (11) arranged vertically and perpendicular to one another. The support spider is mounted on the housing of the dosing base device (4). The support spider (5) has a height (h), which is at least the height ($h_1$) of the material hopper container (2), which extends over the dosing base device (4), and corresponds to the immersion depth ($h_2$) of the material hopper (3) into the dosing base device (4). A material hopper cover (6) is provided on the end of the support spider (5) facing away from the dosing base device (4).

18 Claims, 2 Drawing Sheets

Figure 1:
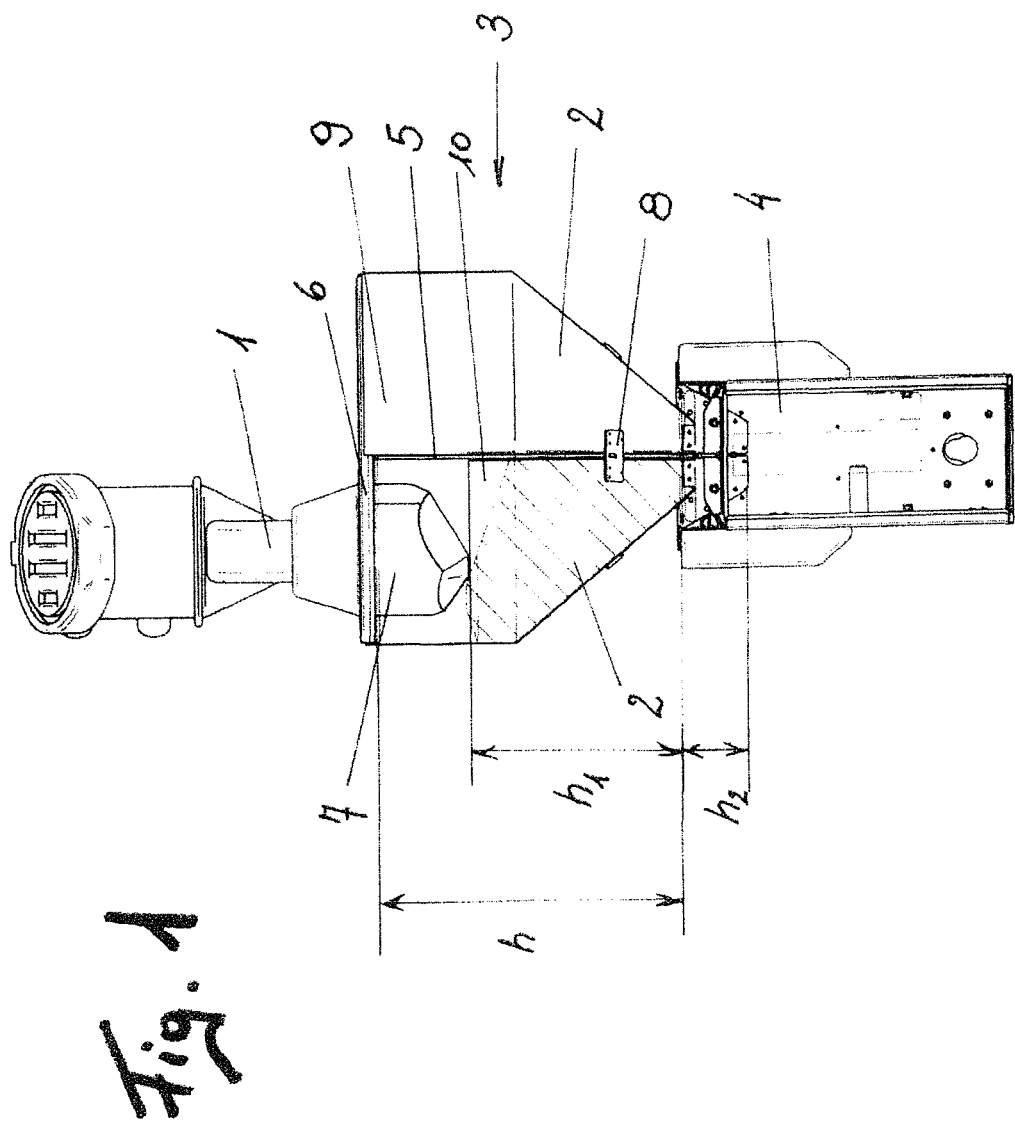

(51) Int. Cl.
    *G01G 13/00*     (2006.01)
    *B29C 45/18*     (2006.01)
    *B65G 65/40*     (2006.01)
    *B65D 88/32*     (2006.01)
    *G01G 17/00*     (2006.01)

(52) U.S. Cl.
    CPC ........... *G01G 13/003* (2013.01); *G01G 17/00* (2013.01); *G01G 19/24* (2013.01); *G01G 21/28* (2013.01)

(56) References Cited

U.S. PATENT DOCUMENTS

| | | |
|---|---|---|
| 2002/0113080 A1 | 8/2002 | Beal et al. |
| 2008/0049546 A1 | 2/2008 | O'Callaghan |
| 2012/0195154 A1 | 8/2012 | Maguire |
| 2015/0197037 A1 | 7/2015 | Maguire |

FOREIGN PATENT DOCUMENTS

| | | |
|---|---|---|
| DE | 69732659 | 12/2005 |
| DE | 05075472 | 3/2006 |

DEVICE FOR DOSING BULK MATERIAL

The invention relates to a device for dosing bulk material, in particular plastic granules, for machines that process plastic granules, in particular for injection moulding machines, wherein a bulk material feed, a material hopper formed by multiple, preferably four, individually removable material hopper containers and arranged under the bulk material feed and ending in a dosing base device, and, optionally, a weighing container with a scale in the dosing base device is provided, and said individual material hopper containers are arranged on a support spider and the support spider is formed by support spider plates arranged vertically and perpendicular to one another and the support spider is mounted on the housing of the dosing base device.

A gravimetric blender is known from U.S. Pat. No. 8,092,070 B2 wherein at least one material storage container is arranged within a frame. A cover plate is provided at the top of the frame. A weigh bin is located within the frame below the hopper. Guides are provided for vertical movement of the cover plate of the hopper, whereby the vertical movements are performed through piston-cylinder systems. The extremely complex effort for lifting the cover plate is disadvantageous in this design.

In addition, a method and a gravimetric mixer for delivering measured quantities of granular materials and colorants, in particular pigments in liquid form, is known from DE 696 27 717 T2.

Furthermore, a gravimetric blender and hopper with integrated discharge valve for granular material is known from DE 05 075 472 T1.

Furthermore, a gravimetric mixer comprising a frame, a removable material storage hopper with a valve, a weighing container with weight detection and a mixing chamber below the weighing container is known from DE 697 32 659 T2.

A device for delivery and dosing of bulk material is also known from DE 195 28 636 A1, wherein the dosing device simultaneously serves as delivery device.

Furthermore, a device for delivery comprising multiple containers is known from US 2008/049546 A1.

Finally, a method for the provision of bulk material before dosing is also known from U.S. Pat. No. 3,822,866 A. The plastic granules are provided by the delivery device in two containers before dosing. This way it is prevented that an idle time occurs, which may occur due to a refill of the container.

The aim of this invention is therefore to create a device of the type mentioned above, which avoids the above disadvantages on the one hand, and on the other hand results in rationalizations in the cleaning of the device.

Said aim is fulfilled by the invention.

The device in accordance with the invention is characterized in that the support spider has a height which corresponds at least to the height of the material hopper container which extends over the dosing base device and to the immersion depth of the material hopper into the dosing base device, and that a material hopper cover is provided on the end of the support spider facing away from the dosing base device. With this invention it is for the first time possible to produce a device for dosing bulk material, as they are customary in plastics technology, rationally and thus economically by a highly intelligent simple structural design. No complex machinery parts, such as pneumatic cylinders, special guides for the lifting and lowering movement of the cover for the material hopper containers are required. In particular, the process of cleaning the material hopper containers may be performed in the most rational manner, as still explained in the following.

Furthermore, the safety aspect is increased immensely by the invention based on the omission of moved parts.

As is generally known, the amounts of plastic granules, preferably new material and/or material to be ground, which are disproportionate for the formulation are filled in parallel or multi-parallel from at least two material hopper containers into the weighing container. Hence, it is possible to increase the throughput for those types of plastic granules which find disproportionate use according to the formulation, as a result of which the batch composition is performed within shortest time.

It is easy to understand that the individual material hopper containers must be cleaned carefully, for example when the granulate changes. Another rationalization of the general process is achieved by shortening the cleaning time. It is simply necessary to lift out the individual material hopper containers from the dosing base device to clean them, so that cleaning is ensured at a minimum expenditure of time.

With this invention, the production of the device thus becomes more economic in an advantageous manner and moreover a rationalization effect is achieved by minimizing the idle time of the system for cleaning. This is added, as already mentioned above, by the safety aspect.

In accordance with a special embodiment of the invention, the metal hopper cover extends over the material hopper or over individual material hopper containers. According to the system design, full coverage of the material hopper or partial coverage of the material hopper containers is possible, if the material hopper containers are differently high. In addition, the design in accordance with the invention provides the advantage that a material separator serving as bulk material feed does not need to be disassembled for the cleaning process.

In accordance with a feature of the invention, the metal hopper cover comprises openings for feeding the bulk material from the bulk material feed into the material hopper container. As a result, the bulk material feed is enabled in the simplest manner.

In accordance with a special feature of the invention, the material hopper cover comprises an immersion pipe in the direction of the dosing base device for feeding the bulk material. By the arrangement of this immersion pipe, which preferably ends in the upper area of the material hopper container, an overfilling of the material hopper container with bulk material is practically ruled out.

In accordance with a special embodiment of the invention, the material hopper composed of multiple individual material hopper containers is tapered, preferably pyramidal or conical, in the direction of the weighing container. As a result of this structural measure, the bulk material is fed to the dosing valve and subsequently to the weighing container in a targeted manner.

In accordance with another embodiment of the invention, the sides of each material hopper container forming the outer lateral surface of the material hopper are designed higher, namely by at least the immersion depth of the material hopper into the dosing base device, in the area of the bulk material feed than the sides adjacent to the support spider on the inside. Said sides forming the lateral surface are adjacent to the material hopper cover outside. This way, simple lifting out of the individual material hopper containers is also ensured.

In accordance with an alternative embodiment of the invention, the sides of each material hopper container forming the outer lateral surface of the material hopper in the area of the bulk material feed are formed by sheet metal faceplates having a height which corresponds at least to the immersion depth of the material hopper into the dosing base device. These faceplates are also adjacent to the material hopper cover outside, so that lifting out of the individual material hopper containers is ensured.

In accordance with another special feature of the invention, fastening brackets for the material hopper containers are provided to the support spider. As a result of these fastening brackets, the individual material hopper containers are held or stabilized in their position, in particular also if a vertical, upwardly directed opening force is exercised on the dosing valve.

The invention is explained in more detail on the basis of the embodiment illustrated in the figure.

The figures show:

FIG. 1 a section through the device and

Figure 2:
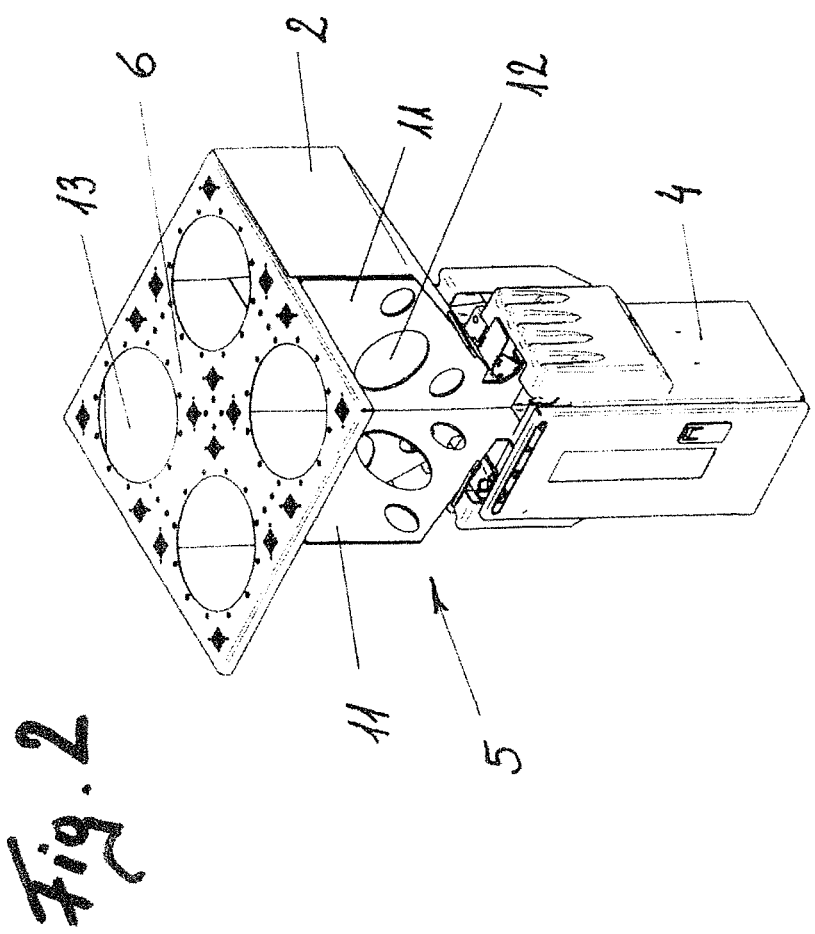

FIG. 2 a support spider with a material hopper cover and a dosing base device.

The invention for dosing bulk material, in particular plastic granules, for machines that process plastic granules, in particular for injection moulding machines, has a modular design. The invention according to FIG. 1 comprises a bulk material feed 1, for example a material separator, a material hopper 3 formed by multiple, preferably four, individually removable material hopper containers 2 and arranged under the bulk material feed 1. Said material hopper 3 ends in a dosing base device 4. Optionally, a weighing container with a scale in the dosing base device is provided. The individual material hopper containers 2 are arranged on a support spider 5, whereby the support spider 5 is formed by support spider plates 11 arranged vertically and perpendicular to one another and the support spider 5 is mounted in the dosing base device 4.

The support spider 5 has a height h, which is at least the height $h_1$ of the material hopper container 2, which extends over the dosing base device 4, and corresponds to the immersion depth $h_2$ of the material hopper container 2 into the dosing base device 4. A material hopper cover 6 is provided on the end of the support spider 5 facing away from the dosing base device 4. The metal hopper cover 6 extends over the material hopper 3. Naturally, it may also just extend over individual material hopper containers 2. Furthermore, the metal hopper cover 6 comprises openings 13 for feeding the bulk material from the bulk material feed 1 into the material hopper container 2.

Furthermore, the material hopper cover 6 comprises an immersion pipe 7 in the direction of the dosing base device 4 for feeding the bulk material. Said immersion pipe 7 serves for defining the height of the bulk cone in the material hopper container 2.

The individual material hopper containers 2 are held or stabilized in their position, in particular also if a vertical, upwardly directed opening force is exercised on the dosing valve, by fastening brackets 8.

The sides 9 of each material hopper container 3 forming the outer lateral surface of the material hopper 3 are designed higher, namely by at least the immersion depth $h_2$ of the material hopper 3 into the dosing base device 4, in the area of the bulk material feed 1 than the sides 10 adjacent to the support spider 5 on the inside. Naturally, sheet metal faceplates could also be used instead of the higher sides 9.

For easier handling, each material hopper container 2 may comprise two handles. For more convenient cleaning and also for visual check, each material hopper container 2 may comprise an inspection glass. Furthermore, the material hopper container 2 may consist of wear-resistant stainless steel.

The material hopper 3 composed of multiple individual material hopper containers 2 is tapered, preferably pyramidal or conical, in the direction of the weighing container.

Each material hopper container 2 comprises a dosing valve at its lower end in the dosing base device 4. A weighing container connected with a scale may be arranged underneath, and a mixer underneath the weighing container. A platform load cell may be provided as scale and a ball mixer as mixers. The platform load cell may be connected with the dosing valve through a control unit.

The dosing valve may be designed as a self-closing dosing valve, whereby the dosing valve is opened through a pneumatic cylinder, preferably arranged on the dosing base device 4.

In the dosing device shown above, different amounts of different plastic granules are introduced in batches according to freely adjustable formulations. Each individual type of plastic granulate, such as for example new material, main batch, additive and/or material to be ground, is successively passed through the dosing valve into the weighing container from a material hopper container 2, weighed in the weighing container and the formulation is subsequently mixed in the ball mixer.

FIG. 2 shows the support spider 5, which is formed by rectangular, vertical plates 11. To save weight, these plates 11 may comprise recesses 12. The support spider 5 is mounted in the dosing base device 4. The material hopper cover 3 with openings 13 for feeding the bulk material is provided on the end facing away from the dosing base device 4.

The front material hopper containers 2 are lifted out in the graphically shown FIG. 2, hence not drawn, in order to illustrate the plate structure of the support spider 5. The rear material hopper container 2 is certainly shown, however.

The invention claimed is:

1. A device for dosing bulk material for a molding machine, comprising:
    a bulk material feed;
    a material hopper arranged beneath the bulk material feed and comprising multiple individually removable material hopper containers;
    a dosing base device located at a lower end of the material hopper;
    a support spider mounted on a housing of the dosing base device and comprising vertically arranged support spider plates that are arranged perpendicular to one another; and
    a metal hopper cover located an upper end of the support spider and extending over either the material hopper or the multiple material hopper containers,
    wherein the support spider has a vertical height (h), measured from an upper surface of the dosing base device, which is at least equal to a height (h1) of one of the multiple material hopper containers, measured from the upper surface of the dosing base device, and
    wherein a lower end of either the material hopper or the multiple material hopper containers, measured from the upper surface of the dosing base device, extends down into the dosing base device by an immersion depth (h2).

2. The device of claim 1, wherein the bulk material comprises plastic granules and the molding machine is an injection molding machine.

3. The device of claim 1, wherein said multiple hopper containers is four hopper containers.

4. The device of claim 1, further comprising a weighing container with a scale arranged in the dosing base device.

5. The device of claim 1, wherein the multiple material hopper containers are arranged on the support spider.

6. The device of claim 1, wherein the metal hopper cover comprises openings for feeding the bulk material from the bulk material feed into the multiple material hopper containers.

7. The device of claim 1, wherein the metal hopper cover comprises a downward extending immersion pipe.

8. The device of claim 1, wherein the material hopper is one of:
   tapered;
   pyramidal; or
   conical.

9. The device of claim 1, wherein side walls of each of the multiple material hopper containers define outer lateral surfaces of the material hopper.

10. The device of claim 9, wherein the support spider is located inside the material hopper.

11. The device of claim 9, wherein the side walls comprise sheet metal.

12. The device of claim 1, further comprising fastening brackets for securing together the multiple material hopper containers.

13. The device of claim 1, wherein a number of the multiple material hopper containers is equal to a number of the vertically arranged support spider plates of the support spider.

14. A device for dosing bulk material for a molding machine, comprising:
   a bulk material feed;
   a material hopper arranged beneath the bulk material feed;
   the material hopper comprising:
      multiple individually removable material hopper containers;
      a support spider comprising vertically arranged support spider plates that are arranged perpendicular to one another; and
      a hopper cover located an upper end of the support spider and extending over the multiple material hopper containers; and
      a downward extending immersion pipe extending down from the hopper cover; and
   a dosing base device located at a lower end of the material hopper,
   wherein the vertically arranged support spider plates of the support spider have a vertical height (h), measured from an upper surface of the dosing base device, which is at least equal to a height (h1) of one of the multiple material hopper containers, measured from the upper surface of the dosing base device, and
   wherein a lower end of the multiple material hopper containers, measured from the upper surface of the dosing base device, extends down into the dosing base device by an immersion depth (h2).

15. The device of claim 14, wherein a number of the multiple material hopper containers is equal to a number of the vertically arranged support spider plates of the support spider.

16. The device of claim 14, wherein the vertical height (h) is greater than the vertical height (h1).

17. A device for dosing plastic granules for an injection molding machine, comprising:
   a bulk material feed;
   a material hopper arranged beneath the bulk material feed;
   the material hopper comprising:
      four individually removable material hopper containers;
      a support spider comprising four vertically arranged support spider plates; and
      a hopper cover located an upper end of the support spider and extending over the multiple material hopper containers; and
   a dosing base device located at a lower end of the material hopper,
   wherein the vertically arranged support spider plates of the support spider have a vertical height (h), measured from an upper surface of the dosing base device, which is at least equal to a height (h1) of one of the multiple material hopper containers, measured from the upper surface of the dosing base device, and
   wherein a lower end of the multiple material hopper containers, measured from the upper surface of the dosing base device, extends down into the dosing base device by an immersion depth (h2).

18. The device of claim 17, wherein the vertical height (h) is greater than the vertical height (h1) and the hopper cover comprises a downward extending immersion pipe.

* * * * *